United States Patent [19]
Bederke et al.

[11] Patent Number: 5,426,156
[45] Date of Patent: Jun. 20, 1995

[54] BINDER COMPOSITION AND ITS USE IN SURFACE COATINGS

[75] Inventors: Klaus Bederke, Sprockhövel; Hermann Kerber; Walter Schubert, both of Wuppertal; Gerhard Bremer, Frechen; Thomas Brock, Hürth-Hermühlheim; Fritz Sadowski, Brauweiler bei, all of Germany

[73] Assignee: Herberts Gesellschaft mit beschrankter Haftung, Wuppertal, Germany

[21] Appl. No.: 341,450

[22] Filed: Nov. 16, 1994

Related U.S. Application Data

[63] Continuation of Ser. No. 219,869, Mar. 30, 1994, abandoned, which is a continuation of Ser. No. 4,172, Jan. 13, 1993, abandoned, which is a continuation of Ser. No. 575,372, Aug. 29, 1990, abandoned.

[30] Foreign Application Priority Data

Sep. 29, 1989 [DE] Germany .......................... 39 32 517.2

[51] Int. Cl.$^6$ ............................................. C08L 79/02
[52] U.S. Cl. .................................... 525/426; 525/418; 525/420; 525/450; 525/451
[58] Field of Search ................ 525/426, 420, 418, 450, 525/451

[56] References Cited

U.S. PATENT DOCUMENTS

| | | | |
|---|---|---|---|
| 3,584,076 | 6/1971 | Chetakian | 260/863 |
| 3,666,726 | 5/1972 | Grogler et al. | 260/77.54 X |
| 3,892,903 | 7/1975 | Dowbenko | 428/460 |
| 4,042,646 | 8/1977 | Edamura et al. | 525/38 |

FOREIGN PATENT DOCUMENTS 0160824  11/1986  European Pat. Off. ............ 525/305

*Primary Examiner*—W. Robinson Clark
*Attorney, Agent, or Firm*—Schweitzer Cornman & Gross

[57] ABSTRACT

Previous two-component coatings with enamine components cured very slowly at low temperatures and led to yellowed products. A binder composition is prepared which cures rapidly at low temperatures and leads to non-yellowing products. It contains as CH-acid component a polymer with at least two enamine functions in the molecule, obtained by A) transesterification of a $\beta$-keto-ester with hydroxyl-group-containing compounds or polymers which contain at least two hydroxyl groups in the molecule, with an OH value of at least 50 and a number-average molecular weight of 500 to 10,000, followed by reaction with ammonia or primary and/or secondary amines, and B) as $\alpha,\beta$-unsaturated component a compound with at least two groups of the general formula $R_1R_2C=CR_3-X$; in which X signifies —CO— which is bonded via the residue of a di- or polyhydric alcohol, a di- or polyamine or an aminoalcohol to a further $R_1R_2C=CR_3-X$ group, where $R_1$, $R_2$ and $R_3$ signify hydrogen or an alkyl group, components A) and B) are present in the ratio 2:1 to 1:1.5 relative to their equivalent weights, the composition exists as a two-component system, and component A) contains a Lewis or Brönsted base as catalyst.

8 Claims, No Drawings

BINDER COMPOSITION AND ITS USE IN SURFACE COATINGS

This is a continuing application of U.S. Ser. No. 08/219,869, filed on Mar. 30, 1994, which was a continuing application of U.S. Ser. No. 08/004,172, filed on Jan. 13, 1993, which was a continuation of U.S. Ser. No. 07/575,372, filed on Aug. 29, 1990, all now abandoned.

BACKGROUND AND SUMMARY OF THE INVENTION

The invention relates to a two-component binder which is suitable for surface coating compositions.

In DE-A-37 13 511 two-component paint binders based on methacrylic acid-2-acetoacetoxy-ethyl esters and their reaction products with aldehydes or ketones and amines are described. These systems cure very slowly at room temperature, however, and lead to yellow-coloured products.

In EP-A-0 160 824 two-component paints based on reaction products of compounds having CH-acid groups with olefinically unsaturated compounds are described. Enamines are not mentioned as CH-acid compounds. These systems cure insufficiently at room temperature and are therefore unsuitable for repair painting in the motor vehicle sector in workshops which have no stoving installations.

Two-component surface coatings curable by heating, based on CH-acid compounds and compounds with at least two $\alpha,\beta$-unsaturated groups, are also described in EP-A-0 224 158. Used there as CH-acid compounds are compounds containing methane tricarboxylic acid amide groups.

In EP-A-0 203 296 an isocyanate-free two-component binder system is described, which depends on the reaction of olefinically unsaturated compounds with blocked polyamines. This system can indeed be cured at room temperature, but resistance to gasoline and hardness of the system are reached only slowly; also gloss and flow of the surface are not satisfactory.

This problem is solved by the binder defined according to the claims.

DETAILED DESCRIPTION OF THE INVENTION

The binder according to the invention can contain organic solvents, for example as residual solvents from the manufacture or by subsequent addition for adjustment of favourable viscosities for use. Such solvents can for example be those mentioned later for production of the surface coatings.

According to the invention an enamine component A) with at least two enamine functions in the molecule can be used as CH-acid component. Such enamine components can be produced by transesterification of an aliphatic $\beta$-ketocarboxylic acid ester with a polyol followed by reaction with amines and/or ammonia.

Suitable $\beta$-ketocarboxylic acid esters are for example esters of acetoacetic acid or alkylsubstituted acetoacetic acids, such as $\alpha$- and/or $\gamma$-methylacetoacetic acid. Suitable esters of these acids are those with aliphatic alcohols, preferably lower alcohols with 1 to 4 carbon atoms, such as methanol, ethanol or butanol.

As polyols for reaction with the $\beta$-ketocarboxylic acid esters, groups a) to d) according to the claims can be considered. Suitable alkane-di- and -polyols of group a) are those with straight and branched chains with 2 to 12 carbon atoms. They contain at least two hydroxyl functions, preferably however at least three. Examples of these are propanediol, butanediol, hexanediol, glycerine, trimethylolpropane and pentaerythritol.

Examples of hydroxyl-group-containing poly(meth)acrylates b) based on (meth)acrylic acid hydroxyalkyl esters with 4 to 12 carbon atoms in the alkyl part are hydroxyalkyl esters of acrylic acid or methacrylic acid with alcohols with at least two hydroxyl groups such as 1,4-butanediol mono(meth)acrylate, 1,6-hexanediol mono(meth)acrylate or 1,2,3-propanetriol mono(meth)acrylate. Examples of hydroxyl-group-containing poly(meth)acrylamides b) based on (meth)acrylic acid hydroxyalkylamides are amides of acrylic acid or methacrylic acid with hydroxyalkylamines or di(hydroxyalkyl)amines, each having 2 to 12 carbon atoms in the alkyl part, which can have one or more hydroxyl groups, such as acrylic acid hydroxyethylamide. The expression (meth)acrylic acid used in the present specification and the claims is intended to signify acrylic acid and/or methacrylic acid.

The hydroxyl-group-containing poly(meth) acrylates of component b) can be homo- or co-polymers. They have a number-average molecular weight of 1000 to 10,000, preferably of 3000 to 6000. Copolymerizable monomers for the production of the copolymers are $\alpha,\beta$-unsaturated monomers, radical-polymerizable monomers from the group of esters of $\alpha,\beta$-unsaturated carboxylic acids, such as acrylic acid or methacrylic acid, in which examples of the alcohol components are methyl, ethyl and propyl alcohols and their isomers and higher homologues. Further examples are diesters of maleic or fumaric acid, in which the alcohol component is the same as mentioned above. Further examples are vinylaromatic compounds such as styrene, $\alpha$-methylstyrene and vinyltoluene. Further examples are vinyl esters of short-chain carboxylic acids, such as vinyl acetate, vinyl propionate and vinyl butyrate.

The hydroxyl-group-containing poly(meth)acrylates of the above-defined component c) can be modified poly(meth)acrylate homo- and co-polymers, as described under b), whose hydroxyl groups can be reacted fully or in part with cyclic esters, such as e.g. of hydroxylcarboxylic acids with 4 to 6 carbon atoms, such as butyrolactone or caprolactone. The modified poly(meth)acrylates of component c) obtained have a number-average molecular weight Mn of 1000 to 10,000.

Examples of the polyester polyols and polyether polyols of component d) are those with a number average molecular weight Mn of 500 to 2000. Specific examples are reaction products of di- or tricarboxylic acids, such as adipic acid or trimellitic acid, with polyols, the polyols being present in excess. Further examples are reaction products of di- or triols, such as propanediol, butanediol or glycerol, with ethylene oxide or propylene oxide.

The synthesis of the enamine component with at least two enamine functions can for example be carried out in several stages. The polyol is first, after removal of solvent which may be present, transesterified with the aliphatic $\beta$-ketocarboxylic acid ester and after removal of the alcohol liberated the $\beta$-ketoester obtained is reacted with ammonia and/or the primary or secondary amines with elimination of water to the enamine function.

The transesterification of the polyol can for example be carried out by starting with the polyol, which can optionally be freed of solvent by applying a vacuum.

The β-ketocarboxylic acid ester is now added in excess, for example dropwise. The reaction is carried out at elevated temperature; the alcohol liberated is removed from the system. To accelerate the reaction the addition of a catalyst is also possible. Examples of such catalysts are acids, such as formic acid or p-toluenesulphonic acid. It is convenient during the transesterification to raise the reaction temperature continuously (for example in steps of 10° C./20 min) until a temperature is reached which is just (about 10° C.) below the boiling point of the β-ketocarboxylic acid ester. After quantitative transesterification the excess β-ketocarboxylic acid ester is removed, for example by applying a vacuum. The mixture can then be cooled and diluted with an inert solvent which can be distilled azeotropically with water, for example an aromatic hydrocarbon such as toluene or xylene (for example to a solids content of the order of 70%). Then follows the reaction with ammonia and/or primary or secondary amine. This can be carried out for example by dropwise addition of an aqueous ammonia solution (for example with concentrations up to 25%) or by the admixing of a deficiency (about 90% relative to the incorporated β-ketocarboxylic acid ester) of a primary or secondary amine. This reaction also can be catalyzed. Suitable catalysts are acids, such as formic acid or p-toluenesulphonic acid. The water liberated in this reaction is circulated out azeotropically with the inert solvent. When reaction has finished, the solids content can be adjusted to a desired value. To this end solvent present can be removed completely or partially, e.g. by distillation. But further solvent or water can also be added. To this end e.g. such solvents are used as are required in the surface coating compositions which will be prepared later. Examples of such solvents are mentioned later in the description of the surface coating compositions which can be prepared.

Besides ammonia, suitable amines for the production of the enamine component are primary and secondary amines. These are aliphatic linear or branched and cycloaliphatic monoamines whose alkyl groups have 1 to 10 carbon atoms. Preferred examples of primary amines are methyl-, ethyl-, propyl-, butyl-, and especially n-hexyl- and n-octylamine.

Preferred examples of secondary amines are di-n-butylamine, diisobutylamine, diisopropylamine, dimethylamine, dioctylamine and dicyclohexylamine.

The reaction with secondary amines, whereby tertiary enamines are produced, has proved especially advantageous. As a result of the bulky alkyl groups on the N-atom a possible chelation of metal ions by the enamine structure is impeded, so that colourations which can occur through such chelation are largely excluded.

As further binder component B), a compound is used in the binder compositions according to the invention which has at least two unsaturated functional groups of the general formula (I) $R_1R_2C=CR_3-X$, in which $R_1$, $R_2$, $R_3$ and X are defined as in the claims. These groups can be joined together via short- or long-chain hydrocarbon groups, oligomers and/or polymers, where these oligomers and polymers can have e.g. number average molecular weights (Mn) of 1000 to 10,000. Possible oligomers and polymers are for example saturated and/or unsaturated polyethers, polyesters or polyurethanes containing two or more hydroxyl groups, e.g. those based on maleic acid, phthalic acid and diols, hydroxyl-group-containing acrylic resins, aliphatic or preferably aromatic, optionally hydroxyl-group-containing epoxy resins, e.g. those based on diphenylolpropane and/or diphenylolmethane, hydantoin and/or amine resins. The residue of general formula (I) can here be bound as an ester, e.g. by addition of acrylic acid or methacrylic acid or their derivatives to epoxy groups of epoxy resins or by esterification to hydroxyl groups of polyols. Suitable polyhydric alcohols are for example alkanediols and triols with 2 to 8 carbon atoms, such as ethanediol, the various propane-, butane-, hexane- and octanediols or their homologues, the corresponding oligomeric ethers, and further glycerol, trimethylolethane or trimethylolpropane, hexanetriol, pentaerythritol, dipentaerythritol and sorbitol as well as polyvinylalcohol.

The groups of the general formula (I) can also be bonded via NH groups and/or OH groups to polyamines, polyamides or polyiminoamides with at least two NH groups or at least one NH group and at least one OH group. As NH-group-containing starting compounds for such compounds can be mentioned for example di- and polyamines, such as alkylene diamines and their oligomers, such as ethylenediamine, propylenediamine, butylenediamine, diethylenetriamine, tetramines and higher homologues of these amines, as well as aminoalcohols such as diethanolamine or the like. Also to be considered as amines are e.g. aminocarboxylic acid esters of polyhydric alcohols. To be considered as compounds containing NH groups are e.g. acrylic- or methacrylic acid polyamides, and also polyurethanes, e.g. polyisocyanates capped in the form of polyurethane groups, such as those obtained by reaction of hydroxyethyl acrylate with polyisocyanates, amine resins such as methoxymelamines, preferably hexamethylolmelamine and urea resins, in which the residue of general formula (I) is bonded with the —CO— group to the amine groups of these compounds as amide. If these amine compounds have available OH groups or hydroxyalkyl groups, it is also possible for the residue of formula (I) to be bonded to these compounds as an ester or alternatively via an ether group. For the ether bond of the residue of formula (I), one can start with a hydroxyalkyl ester or a hydroxyalkylamide of an unsaturated acid such as acrylic acid.

The residue of the general formula (I) of component B can be derived from a singly or multiply-unsaturated monocarboxylic acid, e.g. with 2 to 10, preferably 3 to 6 carbon atoms, such as cinnamic acid, crotonic acid, citraconic acid, mesaconic acid, dihydrolaevulinic acid, sorbic acid, preferably acrylic acid and/or methacrylic acid.

The component B can be free of solvents or else contain residual solvent from its production, e.g. aliphatic and/or aromatic hydrocarbons. The solids content can be adjusted to desired values, e.g. by removal of the residual solvent, for example by distillation, or by addition of water or solvents which are required for the subsequent production of surface coatings and will be described later. Preferably the same solvent is used as for the component A).

The binders according to the invention exist in two-component systems. The components A) and B) are stored separately and only mixed with each other before use. The component A) contains admixed as the component C) catalysts in the form of Lewis bases or Brönsted bases, the conjugate acids of the latter having a pKa value of at least 10. The component C) can consist of one or more catalysts. Lewis bases have proved especially suitable, such as those of the group of cycloaliphatic amines, such as diazabicyclooctane (DABCO), tertiary aliphatic amines such as triethylamine, tripropylamine, N-methyldiethanolamine, N-methyldiisopropylamine, as N-butyldiethanolamine, as well as amidines such as diazabicycloundecene (DBU) and guanidines such as e.g. N,N,N',N'-tetramethylguanidine. Further examples are alkyl- or aryl-substituted phosphanes such as e.g. tributylphosphane, triphenylphosphane, tris(p-tolyl)phosphane, methyldiphenylphosphane, as well as hydroxy- and amine-functionalized phosphanes such as e.g. tris(hydroxymethyl)phosphane and tris(dimethylaminoethyl)phosphane.

Examples of the Brönsted bases which can be used are alcoholates, such as sodium or potassium ethylate, quaternary ammonium compounds such as alkyl-, aryl- or benzylammonium hydroxides or halides, such as e.g. tetraethyl- or tetrabutylammonium hydroxide or fluoride, as well as trialkyl- or triarylphosphonium salts or hydroxides.

The amount of the catalyst is in general 0.01 to 5% by weight, preferably 0.02 to 2% by weight, relative to the total solids content of components A) and B).

The ratio of the equivalent weights of components A) and B) is 2:1 to 1:1.5, e.g. 1 to 1.5:1.

The equivalent weight is defined as the amount in grams which contains 1 mole of the respective functional group, that is for component A) the enamine group and for component B) the olefinic double bond.

The binder compositions according to the invention are so-called two-component systems. This means that components A) and B) are stored separately and are mixed only before use or for use for example for the production of surface coatings. The binder compositions according to the invention can be formulated in the usual way to surface coatings, for example paints. This occurs in general by addition of solvents or water. Here it is possible to prepare a mixture of the components A), which also contains the component B), and B) and to convert this in the usual way, by the addition of solvents or water and common additives, to surface coatings. The possibility also exists, however, of first converting one of the components A) or B) by addition of solvents or water and common additives and then admixing the other component.

Suitable organic solvents for the production of surface coatings, for example paints, are those which are also used in the production of the individual components A) and B). Examples of such solvents are organic solvents such as aliphatic and aromatic hydrocarbons, for example toluene, xylene, mixtures of aliphatic and/or aromatic hydrocarbons, esters, ethers, and alcohols. These are common paint solvents. For the production of surface coatings from the binders according to the invention, aqueous solutions can also be prepared. To this end suitable emulsifiers such as are common in the paint sector can optionally be used.

For the production of the surface coatings common additives, such as are usual for example in the paint sector, can be added.

Examples of such additives are pigments, for example transparent or covering colour-bearing pigments such as titanium dioxide or carbon black and effect pigments, such as metal flake pigments or pearly lustre pigments. The binder compositions according to the invention are particularly suitable for surface coatings which contain such effect pigments. They preferably contain effect pigments together with transparent colour-bearing pigments or covering colour-bearing pigments together with fillers.

Further examples of additives are fillers, e.g. talc and silicates; plasticizers, light-protection agents, stabilizers and flow agents, such as silicone oils.

The surface coatings produced from the binders according to the invention are adjusted to the desired application viscosity by appropriate control of the addition of solvents and/or additives.

The surface coatings can be adjusted according to the quantity ratio of the components A) to the component B), equivalent weight and quantity of catalyst to pot lives between 1 and 24 hours, so that a long processing duration of the finished surface coating from the two-component binder system is guaranteed.

The surface coating thus produced can be applied in usual ways, for example by dipping, spraying, brushing or electrostatically.

The curing of the coatings made from the surface coatings can be carried out in a wide temperature range of e.g. $-10°$ C. to 200° C. Preferred is the temperature range from 20° C. to 80° C., for example room temperature.

From the binders according to the invention, various types of surface coatings can be produced, for example paints, which can be prepared as pigmented finishes or also as varnishes. They are also suitable, however, for the production of fillers, for example.

The surface coatings produced from the binders according to the invention are suitable for coatings which adhere to a multitude of substrates, such as for example wood, textiles, plastic, glass, ceramic and especially metal. The coatings can also be used in the multicoat process. They can thus be applied to usual primary coats, base paints, fillers or to finishes already present. The application can either be made on the hardened previous coats or be carried out wet-in-wet, in which case there is a common stoving of the multilayer coatings. All common previous coats are possible.

A preferred field of application of the binders according to the invention is represented by the preparation of surface coatings for paintwork in the field of the motor vehicle sector. Because of the favourable hardening conditions of the surface coatings produced from the binders according to the invention, these are especially suitable also for motor vehicle repair paintwork.

The present invention consequently refers also to processes for the production of coatings on various substrates, in which a surface coating produced from the binders according to the invention is applied to the substrate, whereupon it is dried and hardened. The invention also refers to the use of the binder compositions according to the invention in transparent paints, fillers or top-coat paints.

In each case one obtains with the surface coatings produced with the binders according to the invention films with good gloss, good hardness and good resistance to water and solvents, especially good gasoline resistance. The curing is very rapid; thus for example a set to touch within a few minutes, such as for example about 10 minutes, at room temperature is achievable.

The following examples serve for the illustration of the invention. All parts (P) and percentages (%) refer to weight.

SYNTHESIS OF ENAMINE-FUNCTIONALIZED RESINS (COMPONENT A))

Example 1 a) Synthesis of an OH-functional resin

Into a 4 l three-neck flask provided with stirrer, thermometer, reflux flask and dropping funnel, 600 P toluene are charged and heated to 111° C. with stirring. Within 5 h a mixture of

| | |
|---|---|
| 235 | P methyl methacrylate |
| 280 | P styrene |
| 307 | P ethyl methacrylate |
| 543 | P butanediol monoacrylate and |
| 40 | P tert.-butyl peroctoate | is added. The product formed has a viscosity of 910 mPas (25° C.), a solids content of 69.6% (1 h/150° C.) and an OH value of 150.

b) 1300 P of the OH-functional resin so prepared is freed from solvent by applying a vacuum at 110° C.

Subsequently at 110° C. 585 P ethyl acetoacetate are added dropwise. The mixture is heated to 130° C., whereby ethanol (ca. 112 g) is eliminated. After stepwise increase of the temperature to 170° C., all volatile constituents are subsequently drawn off under vacuum. Lastly the product is diluted with 1000 P xylene. The product has a solids content of 61.6% (1 h/150° C.) and after adjustment of the solids content to 50% by means of butyl acetate 98/100 a viscosity of 490 mPas (25° C.).

c) 400 P of the so-produced resin functionalized with acetoacetic ester are charged with 1 P 98% formic acid and 43 P 25% aqueous NH3 solution and heated at 85° C., and 11 g water is eliminated within 2½ hours. After completion of the reaction the solids content was adjusted to 50% with butyl acetate 98/100. The product then has a viscosity of 535 mPas (25° C.).

Example 2

To 900 P of the resin functionalized with acetoacetic ester from Example 1 are added 1 P of 98% formic acid and 134 P n-hexylamine, and the mixture is heated to 85° C., ca. 24 g of water being eliminated within 2½ hours. Then the solids content is adjusted to 50% with butyl acetate 98/100. The product then has a viscosity of 1010 mPas (25° C.).

Example 3

To 900 P of the resin functionalized with acetoacetic ester from Example 1 are added 1 P of 98% formic acid and 195 P di-n-butylamine. After heating to 85° C., ca. 27 g water are eliminated within 3 h. Then the solids content is adjusted to 50% with butyl acetate 98/100. The product then has a viscosity of 1390 mPas (25° C.).

SYNTHESIS OF AN ACRYLOYL-UNSATURATED COMPOUND (COMPONENT B))

Example 4 a) Into a 4 l three-neck flask provided with stirrer, thermometer, dropping funnel and reflux condenser, 1000 P xylene are charged and heated to 90° C. with stirring. Within 5 h a mixture of 380 P glycidyl methacrylate
128 P butyl methacrylate
252 P butyl acrylate
200 P styrene and
40 P tert.-butyl peroctanoate is added dropwise. The epoxy-functional resin obtained has a viscosity of 70 mPas (25° C.) and a solids content of 50.1 %) (i h/150° C.).

b) 800 parts of this resin in a 2 l flask provided with stirrer, thermometer, dropping funnel and reflux condenser is heated to 90° C. with stirring. At this temperature a mixture of 50 P acrylic acid and 1 P triphenyl phosphite is added dropwise within 20 minutes and the mixture then reacted until an acid value of 1 is reached.

PRODUCTION OF PAINTS

Example 5

27 P enamine-functionalized resin of Example 1 (component A)),
73 P acryloyl-unsaturated compound of Example 4 (component B)),
6.4 P catalyst solution (20 P triphenylphosphine in 80 P butyl acetate),
0.25 P flow agent (organofunctional silicone oil, commercial product Additol XL 121) and
1.6 P light-protection agent (0.8 P of a solution of a sterically hindered amine, commercial product Tinuvin 292 and 0.8 P of a benzotriazole derivative, commercial product Tinuvin 1130)

were homogenized and adjusted to an application viscosity of 17 to 20" according to DIN 53211 with a solvent mixture consisting of butyl glycol acetate:methoxypropyl acetate:xylene:butyl acetate in the ratio 20:20:30:30. The mixture was then applied to an ordinary commercial base paint based on organic solvents wet-in-wet in 2 to 3 spraying operations with a dry-film thickness of 40 to 100 μm.

Example 6

One worked as in Example 5, except that
as component A)
33 P of the enamine-functionalized resin of Example 2 and
as component B)
67 P of the acryolyl-unsaturated compounds of Example 4 were used.

Example 7

Production of a pigmented top-coat paint:

51 P acryloyl-unsaturated resin of Example 4 (component
1.5 P flow agent (as for Example 5 ), and
8.3 P of an organic red pigment were predispersed with a dissolver and then ground in an agitating ball mill.

The pigment dispersion so obtained was mixed with a further 163 P of the acryloyl-unsaturated resin with stirring.

This pigmented paint so obtained was mixed with

79 P enamine-functionalized resin of Example 1 (component A) and
9 P catalyst solution (20 P triphenylphosphine and 4 P diazabicycloundecene in 80 P butyl acetate), adjusted with butyl acetate to an application viscosity of 17 to 20" according to DIN 53211 and applied to a predried ordinary commercial polyurethane filler with a dry film thickness of 50 to 80 μm.

The systems applied in Examples 5, 6 and 7 showed at room temperature a rapid setting to touch (10 min), a rapid crosslinking, a rapid achievement of premium gasoline resistance (after 16 hours), as well as a high-gloss surface with good flow and good hardness.

We claim:

1. A two-component binder composition comprising primarily components (A) and (B) in the equivalent weight ratio of from 2:1 to 1:1.5,
   (A) a CH-acid component that is a polymer with at least two enamine functions in the molecule and is obtained by transesterification of an aliphatic β-ketocarboxylic acid ester, with one or more OH-containing reactants which have at least two-OH-groups in the molecule, the reactant having an OH value of at least 50 and a number-average molecular weight of from 500 to 10,000, the transesterification next including reaction with ammonia or a primary and/or secondary amine, in the presence of from about 0.01 to about 5% wt. based on the total composition of a Lewis or Brönsted base catalyst the conjugate acid of which has a minimum pKA of 10, and
   (B) an α,β-unsaturated compound containing at least two groups of the formula

$$R_1R_2C=CR_3X \qquad (I)$$

wherein X is —CO— bonded through a member of the group consisting of a polyhydric alcohol, a polyamine, and an aminoalcohol residue to a further $R_1R_2C=CR_3X$ group, and $R_1R_2$ and $R_3$ are independently of each other selected from the group consisting of a hydrogen atom, and a linear or branched chain $C_{1-10}$ alkyl group which can have olefinic unsaturations, and/or one or more OH groups.

2. The two-component binder composition of claim 1, wherein in (A) the OH-group-containing reactant is selected from the group consisting of:
   (i) a linear or branched chain $C_{2-12}$ alkane polyol,
   (ii) a OH-containing poly(meth)acrylate derived from a $C_{4-12}$ alkyl-containing (meth)acrylic acid hydroxyalkyl ester, and a poly(methyl)acrylamide derived from a $C_{2-12}$ alkyl-containing (meth)acrylic acid hydroxyalkylamide, optionally copolymerized with an α,β-unsaturated monomer, having a number-average molecular weight Mn of from 1,000 to 10,000,
   (iii) a OH-containing poly(methy)acrylate derived from a $C_{2-12}$ alkyl containing (meth)acrylic acid hydroxyalkyl ester and optionally a copolymerizable α,β-unsaturated monomer modified with cyclic ester of a $C_{4-6}$ hydroxycarboxylic acid, having a number-average molecular weight Mn of from 1,000 to 10,000, and
   (iv) a polyester polyol or polyether polyol either having a number-average molecular weight Mn of from 500 to 2,000.

3. The binder composition of claim 2, further comprising a pigment.

4. The binder composition of claim 3, wherein said pigment is selected from the group consisting of a metal flake pigment and a pearly luster pigment.

5. The binder composition of claim 3, wherein said pigment is selected from the group consisting of a metal flake pigment and a color bearing pigment, and the composition optionally further comprises a filler.

6. The binder composition of claim 3, wherein said pigment is a color-bearing pigment, and the composition optionally further contains a filler.

7. The binder composition of claim 3, wherein said pigment is selected from the group consisting of a pearly luster pigment and a color bearing pigment, and said composition optionally further contains a metal flake pigment.

8. The binder composition of claim 3, wherein said pigment is selected from the group consisting of a metallic pigment, and a transparent paint.

* * * * *